United States Patent Office 3,144,711
Patented Aug. 18, 1964

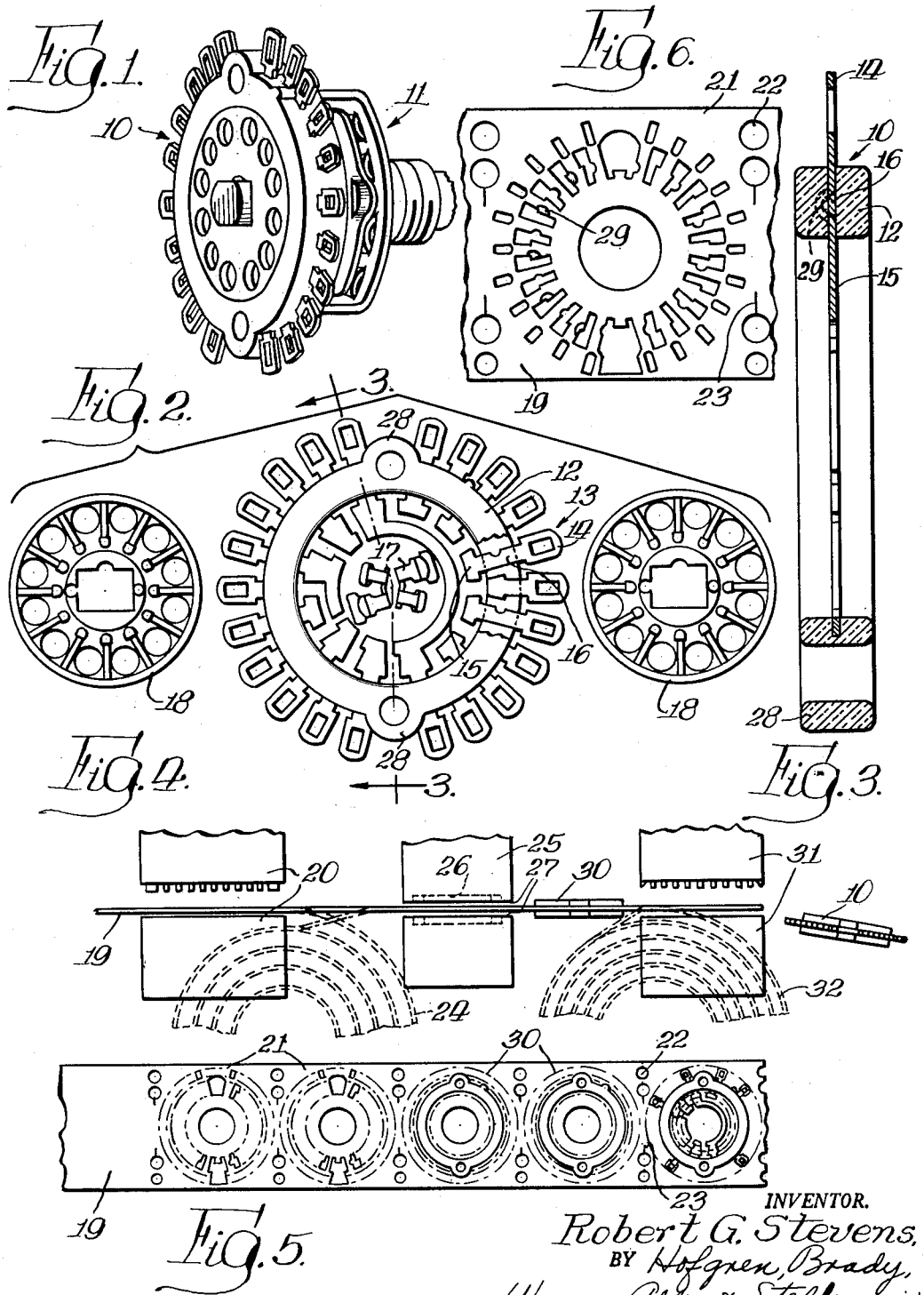

1

3,144,711
METHOD OF FORMING AT LEAST PARTIALLY MOLDED ELEMENTS
Robert G. Stevens, Glen Ellyn, Ill., assignor to Molding Engineers, Inc., a corporation of Illinois
Filed Oct. 5, 1959, Ser. No. 844,365
11 Claims. (Cl. 29—529)

This invention relates to elements which are at least partially molded and in particular to a method of forming the same.

In forming elements such as stator insulators of the type utilized in rotary, electronic control switches a plurality of terminals and slide contacts are arranged in a body of insulating material. The instant invention comprehends a new and improved method of forming such elements wherein the insulating portion of the element is molded about the conducting material defining the terminals and contacts.

An important feature of the invention is, therefore, the provision of a new and improved method of forming at least partially molded elements.

Another feature is the provision of such a method wherein the elements are formed in a continuous strip for facilitated and economical manufacture.

A further feature is the provision of such a method including the preforming of a strip of base material to define a plurality of partially formed elements arranged serially longitudinally of the strip, molding moldable material seriatim to the elements to define a plurality of more completely formed but still partially formed elements, and removing excess material by cutting the same to complete the forming of the elements.

Still another feature of the invention is the provision of such a method wherein the strip is arranged in a roll between at least one pair of such forming steps.

A yet further feature is the provision of such a method further including the step of accurately aligning the partially formed strip with a least one of the molding apparatus and the cutting apparatus through use of cooperating guide means on each of the molding apparatus and/or the cutting apparatus and the strip.

Yet another feature of the invention is the provision of such a method wherein the strip of base material is preformed prior to the molding operation to include a portion defining a portion of the mold-cavity-defining means utilized in the molding operation thereby eliminating the need for highly accurate and costly machining in the forming of the mold-cavity-defining means.

Another feature of the invention is the provision of such a method including the forming of flow diverting surfaces on the strip of base material prior to the molding operation and delivering molding material to flow along the base material to be swirled by the flow diverting surfaces whereby a uniform distribution of the molding material is effected.

A further feature is the provision of such a method wherein the element is generally annular and the molding material is admitted to the cavity at one end of a diameter of the element to flow in two paths along opposite halves of the element and coverge at the other end of the diameter, the flow diverting surfaces of the element serving to assure a continuous, uniform structure of the molded material at the other end of the diameter.

Still another feature of the invention is the provision of such a method including the step of providing an opening intermediate each of the elements in the strip of partially formed elements to facilitate the arrangement of the strip in a roll.

2

Other features and advantages of the invention will be apparent from the following description taken in connection with the accompanying drawing wherein:

FIG. 1 is a fragmentary isometric view of an electronic control switch provided with a stator formed by a method embodying the invention;

FIG. 2 is an exploded view of the stator and rotors of the control switch;

FIG. 3 is an enlarged diametric section of the stator;

FIG. 4 is a diagrammatic fragmentary elevational view illustrating the method of forming the stators, embodying the invention;

FIG. 5 is a plan view of the strip illustrating the different configurations thereof during the forming operations; and FIG. 6 is an enlarged fragmentary plan view of the strip upon completion of the first preforming operation and prior to the molding operation.

The method embodying the invention of forming at least partially molded elements is illustrated in the drawing as comprising a method of forming the stator 10 of an electronic rotary control switch generally designated 11. In such a switch, the stator comprises an annular element including an annular insulator portion 12 and a plurality of electrically conductive parts generally designated 13 and including an outer terminal portion 14, an inner slide contact portion 15 and an intermediate connecting portion 16 extending through the insulator portion 12. Switch 11 further includes a plurality of rotor contacts 17 carried by a pair of rotor plates 18 for selective sliding engagement with the respective slide contacts 15 of the stator.

As diagrammatically illustrated in FIG. 4, stator 10 is formed by first preforming a strip 19, of conductive metal such as Phosphor bronze, as by punching the strip in a first punching apparatus 20 whereby the punched strip defines a plurality of partially formed elements 21 arranged serially longitudinally of the strip as shown in FIG. 5. Concurrently, a plurality of pilot holes 22 is provided in strip 19 intermediate each pair of elements 21 for use in aligning the preformed elements during subsequent operations. Additionally, a pair of slits 23 are formed adjacent the pilot holes; holes 22 and slots 23 define openings in the strip intermediate the preformed elements permitting facilitated arrangement of the preformed strip in a roll 24 as shown in dotted lines in FIG. 4. Such rolling of strip 19 is desirable where such preforming punching operations and subsequent molding operations are conducted in different locations, as by different manufacturers. Alternatively, however, as illustrated in solid lines in FIG. 4, each of the operations in forming stators 10 may be performed by juxtaposed apparatuses whereby rolling and unrolling of the preformed strip between successive forming operations may be omitted.

The punched strip defining preformed elements 21 is next delivered to a molding apparatus 25 having a mold cavity 26 comprised of a pair of recesses opening through confronting planar surfaces 27 of the split molding apparatus 25. The preforming of elements 21, as best seen in FIG. 6, provides a cut-out configuration in the strip 19 such that portions of the strip between the cut-out portions serve as extensions of the mold cavity walls between the cut-out portions so that the need for costly, highly accurate machining of the mold cavity walls themselves to provide such portions is eliminated. Further, as the mating surfaces of the molding apparatus are planar, they may be ground accurately flat to engage the metal strip tightly and prevent flash of the molding material along the surface of the strip during the molding operation. As the tendency to flash is thusly reduced, not only soft molding materials which may be molded at relatively low pressures, such as fibrous glass-reinforced alkyd resins which may be molded at pressures down to 800 pounds per square inch, but also other plastic materials requiring high molding pressure may be used. Suitable molding materials may also comprise thermoplastic materials and the like. The mold cavity 26 is arranged to form an insulator portion 12 of stator 10 which is generally annular, including a pair of diametrically opposed bosses 28.

To provide an improved uniform distribution of the plastic molding material in forming insulator portion 12, the preformed elements 21 are provided with a plurality of upset tabular portions 29 which define flow diverting surfaces extending transversely to the plane of strip 19. The plastic molding material is introduced to cavity 26 at one point thereof as at a boss 28 and flows through the annular cavity in two opposite semiannular paths to meet at a diametrically opposite point thereof. As the plastic material impinges on the tabular portions 29, it is swirled thereby to provide a uniform, homogeneous distribution of the plastic. Further, this swirling action causes the two streams of plastic converging at the opposite diametric point to form a continuous, uniform joint. Thus, as shown in FIG. 5, the combination of the insulator portion 12 and preformed element 21 in strip 19 defines a more completely formed but still partially formed element 30 wherein the insulator portion 12 is firmly bonded to the conductive parts 13.

From molding apparatus 25, the strip of elements 30 is transferred to a second punching apparatus 31 wherein the final forming operation is effected. In being transferred from molding apparatus 25 to punching apparatus 31, the strip may be arranged to form a roll 32, transported to the punching apparatus 31 and fed from the roll 32 to the punching apparatus. Alternatively, where the molding apparatus 25 and punching apparatus 31 are juxtaposed, the strip may be fed directly from the molding apparatus 25 to the punching apparatus 31 as shown in full lines in FIG. 4. Where the strip is arranged to form roll 32, the holes 22 and slits 23 define lines of flexure of the strip permitting the arrangement thereof in the roll configuration notwithstanding the relatively rigid nature of the elements 30 resulting from the provision of the relatively rigid insulating portion 12 therein.

In punching apparatus 31, elements 30 are cut to remove excess strip and molding material to complete the forming of the stators 10. As best seen in FIGS. 1 and 2, only the terminal portions 14 and slide contact portions 15 of the conductive parts 13 are exposed outwardly of the insulator portion 12, the connecting portions 16 thereof being fully embedded within the insulator portion 12. Upon completion of the final punching operation, the completed stators 10 are removed as desired.

While the method embodying the invention is illustrated in FIGS. 4 and 5 as performing the successive operations on one element at a time, it is obvious that by providing suitable apparatuses 20, 25 and 31 a plurality of elements may be formed in each operation for an increased rate of production; illustratively, the apparatuses may be arranged to form five such elements during each operation. The size of rolls 24 and 32 may be as desired; illustratively, the rolls may be such as to contain several thousand elements. While the invention is illustrated as utilizing a substantially flat strip 19, it is obvious that the strip may have any desirable configuration, the apparatuses 20, 25 and 31 being arranged suitably to accommodate it. Further, while the invention is illustrated as including three operational steps, it is obvious that additional steps may be provided, such as a step of plating on the conductive parts while the elements are still in strip form, such as just prior to or subsequent to the molding operation.

While I have shown and described one embodiment of my invention, it is to be understood that it is capable of many modifications. Changes, therefore, in the construction and arrangement may be made without departing from the spirit and scope of the invention as defined in the appended claims.

I claim:

1. The method of molding a ring of plastic material about a plurality of edgewise adjacent angularly spaced fingers, which are coplanar in the finished article and lie in a plane intermediate and substantially parallel with the opposite faces of the molded ring, said method characterized by the steps of: providing some of the fingers with flow directing deflectors disposed to vary the direction of flow of plastic material; forming all of said flow directing deflectors by pressing an edge portion of each finger which is to have a deflector, out of the plane of the finger in such a way that each deflector has an edge which is spaced from the adjacent flat side of the fingers and from which edge the deflector slopes back towards the plane of the finger to merge therewith; placing the plurality of fingers in an annular mold cavity which has an opening into which plastic material may flow into the cavity both clockwise and counterclockwise, with the fingers substantially radial to the annular cavity.

2. A method of forming an at least partially molded device comprising the steps of: providing a base element; upsetting from the base element a flow diverting, outwardly extending projection, the portion of the element which from said projection is upset defining an opening through the element; placing the base element in a mold cavity with the flow diverting projection extending transversely to the direction of flow of molding material along the element adjacent the flow diverting projection as the material fills the cavity; and delivering molding material to the cavity whereby the flow diverting projection swirls the incoming molding material to form a second portion of the device effectively secured to said base element about said projection and extending through said opening.

3. A method of forming an at least partially molded device comprising the steps of: providing a metal strip; upsetting from the strip a flow diverting, outwardly extending projection, the portion of the strip from which said projection is upset defining an opening through the strip; placing the strip in a mold cavity with the flow diverting projection extending transversely to the direction of flow of molding material along the strip adjacent the flow diverting projection at it fills the cavity; and flowing molding material into the cavity along the opposite faces of the strip whereby the flow diverting projection swirls the incoming molding material to form a second portion of the device effectively secured to said strip about said projection and extending through said opening.

4. A method of forming an at least partially molded device comprising the steps of: providing a metal strip; forming out of the flat plane of the strip in at least one direction therefrom a plurality of flow diverting, outwardly extending projections, the portions of the strip from which said projections are formed defining openings through the strip; placing the strip in a mold cavity with the flow diverting projections extending transversely to the direction of flow of molding material along the strip adjacent the flow diverting projections as it fills the cavity; and flowing molding material into the cavity along the opposite faces of the strip whereby the flow diverting projections swirl the incoming molding material to form a second portion of the device effectively secured to said strip about said projections and extending through said openings.

5. The method of forming an at least partially molded device of claim 4 wherein said strip is provided with a further plurality of openings contiguous with said openings resulting from the forming of said projections.

6. The method of forming partially molded elements, comprising the steps of: providing an elongate strip of metal; moving the strip longitudinally along a preselected path defining first, second and third positions; forming a portion of said strip at said first position to define a partially formed element including means for registering said element; moving said strip to dispose said element in said second position; providing injection molding means at said second position having means for cooperation with said registering means for accurately locating said element in said second position; operating said molding means to retain said strip portion against movement and injection mold material onto said retained strip portion to form said element into a more completely formed but still partially formed element; moving said strip to dispose said still partially formed element in said third position; providing forming means at said third position having means for cooperation with said registering means for accurately locating said still partially formed element in said third position; and operating said forming means to form said still partially formed element at said third position to define a complete partially metallic and partially molded element.

7. The method of forming partially molded elements of claim 6 wherein said complete element is separated from said strip during said last-named forming step.

8. The method of forming partially molded elements of claim 6 wherein said last-named forming step comprises cutting said strip and said molded material.

9. The method of forming partially molded elements of claim 6 wherein said molding material comprises thermosetting plastic material.

10. The method of forming partially molded elements of claim 6 wherein said molding material comprises thermoplastic material.

11. The method of forming partially molded elements of claim 6 wherein said registering means are formed by cutting out a portion of said strip.

References Cited in the file of this patent

UNITED STATES PATENTS

| | | |
|---|---|---|
| 1,161,191 | Cook | Nov. 23, 1915 |
| 1,334,276 | Adams | Mar. 23, 1920 |
| 2,166,490 | Gora | July 18, 1939 |
| 2,229,613 | Strauch | Jan. 21, 1941 |
| 2,275,591 | Leonard | Mar. 10, 1942 |
| 2,348,511 | Armel | May 9, 1944 |
| 2,568,771 | Smith | Sept. 25, 1951 |
| 2,876,499 | Schultz | Mar. 10, 1959 |
| 2,971,249 | Anderson et al. | Feb. 14, 1961 |